Patented Sept. 11, 1951

2,567,615

UNITED STATES PATENT OFFICE 2,567,615

ALKYL PERESTERS

Nicholas A. Milas, Belmont, Mass., assignor to Research Corporation, New York, N. Y., a corporation of New York No Drawing. Application April 30, 1945,
Serial No. 591,231

17 Claims. (Cl. 260—453)

This invention relates to an improved process for the production of tertiary alkyl peresters, and its principal object is to provide an efficient and reliable process of manufacturing such products in commercially satisfactory yields.

In accordance with the present invention, a tertiary alkyl perester is produced by simultaneously reacting a tertiary alkyl hydroperoxide and an organic acid chloride, fluoride or anhydride, particularly the chlorides and anhydrides of saturated aliphatic mono- and di-carboxylic acids and aryl mono- and di-carboxylic acids, in the presence of an excess of a relatively concentrated aqueous solution of a basic compound having a reactive basic OH group, at a temperature preferably between 0° and 20° C. for a period of several hours, which is usually required for a substantially complete reaction, after which the perester may be separated from the reactive mixture, washed and dried in accordance with known procedures.

The term "alkyl hydroperoxide," as herein used, connotes those compounds conforming to the general formula $R_1R_2R_3COOH$, wherein $R_1$, $R_2$ and $R_3$ may be the same or different hydrocarbon radicals. Such compounds may be prepared by known procedures, such, for example, as disclosed in my prior Patents Nos. 2,115,206, dated April 26, 1938; 2,176,407, dated October 17, 1939; and 2,223,807, dated December 3, 1940. The term organic acid chloride, as herein used, is intended to include not only the carboxylic acid chlorides and fluorides, but also the anhydrides, which compounds come within the general formulae:

and

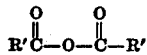

wherein R' may be an alkyl, aryl or heterocyclic group.

The following general equations are illustrative of the reactions which take place in producing alkyl peresters in accordance with the present invention:

I

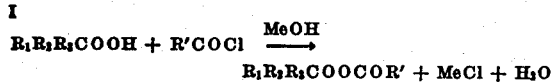

II $$R_1R_2R_3COOH + (R'CO)_2O \xrightarrow{MeOH} R_1R_2R_3COOCOR' + R'COONa + H_2O$$

in which Me preferably is a metal of the alkali or alkaline earth groups.

More specifically, the invention may be illustrated as follows:

III $$(CH_3)_3COOH + C_6H_5COCl \xrightarrow[\text{or NaOH}]{KOH}$$
$$(CH_3)_3COOCOC_6H_5 + KCl(NaCl) + H_2O$$

IV

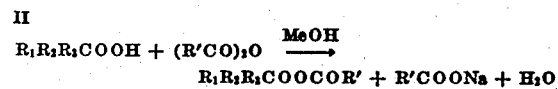

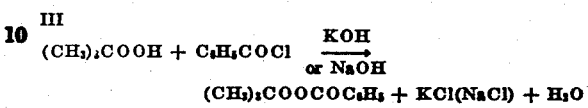

V $$(CH_3)_3COOH + (CH_3CO)_2O \xrightarrow[\text{or NaOH}]{KOH}$$
$$CH_3COOOC(CH_3)_3 + CH_3COOK(Na) + H_2O$$

VI

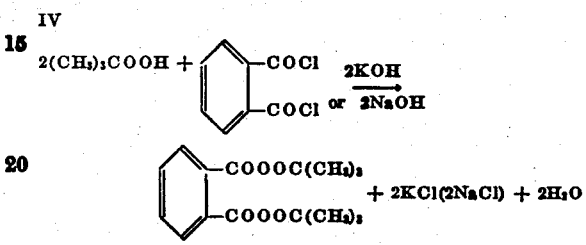

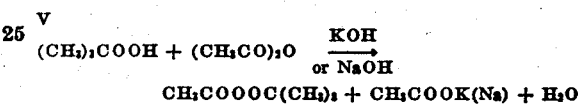

Upon treatment of the last potassium or sodium salt of the succinic acid perester with dilute mineral acid, such as sulfuric or phosphoric acid, the corresponding succinic acid t-butyl perester is formed.

The peresters produced in accordance with this invention are stable viscous liquids or solids depending upon the group to which the perester is attached. They are useful for pharmaceutical (germicidal, fungicidal) and therapeutic purposes, as catalysts in the production of polymeric products from various monomeric unsaturated substances, as vulcanizing agents for various natural and synthetic resins and rubbers, as bleaching agents for flour and textiles, as accelerators of combustion of diesel fuels, and in general for various uses where a stable oxidizing agent is required.

Although, as above indicated, the alkyl hydroperoxides as a class are operative, I have found that t-butyl hydroperoxide is generally representative of this class, and accordingly the following specific examples, embodying the reaction of t-butyl hydroperoxide, potassium hydroxide, and representative organic acid chlorides, are illustrative of the invention:

Example 1

*t-Butyl perbenzoate.*—To 3870 g. of 60% t-butyl hydroperoxide maintained at temperatures between 10° and 20° C. was added, simultaneously with vigorous stirring in the course of 8 hours, 3290 g. of benzoyl chloride and 5660 g. of potassium hydroxide solution containing 1698 g. of solid potassium hydroxide of 85% purity. The reaction mixture was stirred overnight, then the organic layer separated, washed with 2 liters of 5% sodium carbonate solution, followed by three washings of 2 liters of water, and dried over anhydrous magnesium sulfate. Finally, the mixture was filtered and the perester subjected to a high vacuum at 50–60° C. in order to remove all volatile products. The t-butyl perbenzoate (4500 g.; 99.2% yield) thus obtained is a pale yellow viscous liquid having a $d_4^{20}$, 1.026 and an active oxygen content of 8.21%.

Example 2

*t-Butyl perbenzoate.*—To 7017 g. of 60% t-butyl hydroperoxide maintained at temperatures between 10° and 20° C. was added, simultaneously with vigorous stirring in the course of 14 hours, 6580 g. of benzoyl chloride and 7392 g. of potassium hydroxide solution containing 3696 g. of solid KOH of 85% purity. The reaction mixture was stirred overnight, then enough of 5% aqueous solution of potassium hydroxide was added to make the mixture definitely alkaline, and stirring continued for an additional hours. The organic layer was then separated, washed with three washings of 4 liters of water, and dried over anhydrous magnesium sulfate. Finally, the mixture was filtered and the perester subjected to a high vacuum at 50–60° C. in order to remove volatile materials. The perester (8870 g.; 97.7% yield) thus obtained is a pale yellow viscous liquid having a $d_4^{20}$, 1.018 and an active oxygen content of 8.75%.

Example 3

*t-Butyl peracetate.*—To 160 g. of 60% t-butyl hydroperoxide maintained at temperatures between 0° and 10° C. was added, simultaneously with vigorous stirring in the course of two hours, 79 g. of acetyl chloride and 112 g. of 50% potassium hydroxide solution. Stirring was continued for two additional hours, then the organic layer removed, washed with 5% potassium hydroxide solution, twice with an equal volume of water, and dried over anhydrous magnesium sulfate. The mixture was then filtered and the perester subjected to a high vacuum at about 50° C. to remove volatile materials. The perester (46 g.; 35% yield) has a $d_4^{22.5}$, 0.883 and an active oxygen content of 8.43%.

This perester was also made by substituting, in the above example, acetic anhydride for acetyl chloride.

Example 4

*t-Butyl perpalmitate.*—To 6.3 g. of 60% t-butyl hydroperoxide maintained at temperatures between 0° and 10° C. was added, simultaneously in the course of one hour with vigorous stirring 10.5 g. of palmitoyl chloride and 6 g. of 50% potassium hydroxide solution. Stirring was continued overnight at room temperature, then an additional 50 cc. of water was added, and the mixture was further stirred for one hour. The mixture was then saturated with sodium chloride and the flocculent precipitate which separated out was removed and dried in air. The t-butyl perpalmitate was extracted from the dried solid with petroleum ether. Finally, the perester was recrystallized from petroleum ether; M. P. 30.5°–32° C. The percentage active oxygen of this product was found to be 4.69° compared with the theoretical of 4.88%.

Example 5

*t-Butyl perstearate.*—To 75 g. of 60% t-butyl hydroperoxide maintained at temperatures between 0° and 10° C. was added, simultaneously with vigorous stirring in the course of two hours, 151.3 g. of stearoyl chloride and 73 g. of 50% potassium hydroxide solution. Stirring was continued overnight, then extracted with 3–500 cc. portions of ethyl ether. The ether extract was dried over anhydrous magnesium sulfate filtered, and the ether removed under reduced pressure. The semi-solid residue was extracted with petroleum ether which was removed under reduced pressure and the residue recrystallized from methanol. The final product (47.9 g.; 27% yield) had a M. P. of 12–15° C. and an active oxygen content of 5.28% as against the theoretical value of 4.50%.

Example 6

*Di-t-butyl di-perphthalate.*—To 165 g. of 60% t-butyl hydroperoxide maintained at temperatures between 0° and 10° C. was added, simultaneously in the course of two hours with vigorous stirring, 101.5 g. of phthalyl chloride and 316 g. of 50% potassium hydroxide solution. Stirring was continued overnight at room temperature, then the non-aqueous layer separated, washed three times with an equal volume of water, and dried over anhydrous magnesium sulfate. Finally, the mixture was filtered and the filtrate subjected to a high vacuum at 50° C. to remove volatile constituents. The perester (152.5 g.; 98.4% yield) thus obtained was a highly viscous liquid and was crystallized from petroleum ether and found to have a M. P. of 52.5°–54° and an active oxygen content of 12.35%.

Example 7

*Di-t-butyl di-percamphorate.*—To 23.6 g. of t-butyl hydroperoxide maintained at temperatures between 0° and 10° was added, simultaneously with vigorous stirring in the course of one hour, 23.7 g. of camphoryl chloride and 146 g. of 50% potassium hydroxide solution. Stirring was continued for three hours longer than the non-aqueous layer, separated, washed three times with an equal volume of water, dried over anhydrous magnesium sulfate, and filtered. The filtrate was subjected to a high vacuum at 50° C. to remove volatile constituents and analyzed for active oxygen. A yield of 18.5 g. (53.8%) of the di-perester was obtained having an active oxygen content of 9.05% as compared with the theoretical value of 9.30%.

Example 8

*Di-t-butyl di-persuccinate.*—To 42 g. of t-butyl hydroperoxide maintained at temperatures between 0° and 10° was added, simultaneously with vigorous stirring in the course of 1.5 hours, 12.5 g. of succinyl chloride and 41 g. of 50% potassium hydroxide solution. Stirring was continued for four hours longer, then the mixture was extracted with about 50 cc. of ethyl ether, and the ethereal layer shaken with 10% solution of sodium carbonate until it gave a neutral reaction to litmus. It was finally washed with water, dried, and the ether removed. Upon cooling the residue in ice, a crystalline product (7 g. 32%) was obtained which, upon recrystallization from petroleum ether, had a M. P. of 53°–54° and an active oxygen content of 15.80, 15.38, 16.53%, as compared with the theoretical of 12.21%. The high oxygen content of this solid peroxide may be accounted for by the presence in the product of t-butyl hydroperoxide of crystallization.

Example 9

*Di-t-butyl di-peradipate.*—To 105 g. of t-butyl hydroperoxide maintained at temperatures between 0° and 10° was added, simultaneously with vigorous stirring in the course of four hours, 91.5 g. of adipyl chloride and 72.5 g. of potassium hydroxide in 49.7 g. of water. At the end of the reaction 3 g. of additional potassium hydroxide was required to neutralize the reaction mixture. Stirring was continued for two hours longer, then the mixture was extracted with 100 cc. of ether which was washed successively with a 10% solution of sodium carbonate and water, dried and the ether removed. The viscous colorless liquid residue was crystallized by the addition of petroleum ether whereby a white granular solid (50 g.), M. P. 42–43°, was obtained. This had an active oxygen content of 13.84, 13.85, 13.57% as compared with the theoretical of 11.0%. The high active oxygen content of this solid peroxide may be due to the presence in the product of t-butyl hydroperoxide of crystallization, since repeated recrystallizations from petroleum ether failed to affect appreciably either the M. P. or the percentage of the active oxygen.

Example 10

*t-Butyl perfuroate.*—To 150 g. of 60% t-butyl hydroperoxide maintained at temperatures between 0° and 10° was added, simultaneously with vigorous stirring in the course of two hours, 52 g. of furoyl chloride and 54 g. of 50% potassium hydroxide solution. Stirring was continued for three hours longer, then the organic layer was separated, washed with water, dried and the volatile material removed under reduced pressure. The residual viscous liquid (52 g., 71% yield) was analyzed. This material had a $d_4^{20}$, 1.080 and active oxygen of 13.74, 13.47% as compared with 8.70% the calculated value. The high experimental value of active oxygen may be accounted for by the firm association of t-butyl hydroperoxide with the t-butyl perfuroate and is in accord with the high values reported in this specification for other peresters.

I claim:

1. The process of producing a tertiary alkyl perester which comprises simultaneously reacting at a temperature not exceeding 20° and in the presence of an excess of a basic compound having a reactive basic OH group, a tertiary alkyl hydroperoxide and a compound of the group consisting of chlorides and anhydrides of saturated aliphatic mono- and di-carboxylic acids and aryl mono- and di-carboxylic acids.

2. A tertiary alkyl perester of an acid of the group consisting of saturated aliphatic mono- and di-carboxylic acids and aryl mono- and di-carboxylic acids.

3. The process of producing a tertiary alkyl perester, which comprises simultaneously reacting at a temperature not exceeding 20° C. and in the presence of an excess of a basic compound having a reactive basic OH group, a tertiary alkyl hydroperoxide and benzoyl chloride.

4. The process of producing a tertiary alkyl perester, which comprises simultaneously reacting at a temperature not exceeding 20° C. and in the presence of an excess of a basic compound having a reactive basic OH group, a tertiary alkyl hydroperoxide and phthalyl chloride.

5. The process of producing a tertiary alkyl perester, which comprises simultaneously reacting at a temperature not exceeding 20° C. and in the presence of an excess of a basic compound having a reactive basic OH group, a tertiary alkyl hydroperoxide and succinyl chloride.

6. The process of producing t-butyl perbenzoate, which comprises simultaneously reacting at a temperature between 0° and 20° and in the presence of a relatively concentrated aqueous solution of an alkali metal hydroxide, t-butyl hydroperoxide and benzoyl chloride.

7. The process of producing di-t-butyl di-perphthalate, which comprises simultaneously reacting at a temperature between 0° and 20° C. and in the presence of a relatively concentrated aqueous solution of an alkali metal hydroxide, t-butyl hydroperoxide and phthalyl chloride.

8. Process of producing di-t-butyl di-persuccinate, which comprises simultaneously reacting at a temperature between 0° and 20° C. and in the presence of a relatively concentrated aqueous solution of an alkali metal hydroxide, t-butyl hydroperoxide and succinyl chloride.

9. Di-t-butyl di-perphthalate.

10. Di-t-butyl di-persuccinate.

11. t-Butyl perbenzoate.

12. The process of producing a tertiary alkyl perester, which comprises simultaneously reacting at a temperature not exceeding 20° C. and in the presence of an excess of a basic compound having a reactive basic OH group, a tertiary alkyl hydroperoxide and acetyl chloride.

13. The process of producing t-butyl peracetate, which comprises simultaneously reacting at a temperature between 0° and 20° C. and in the presence of a relatively concentrated aqueous solution of an alkali metal hydroxide, t-butyl hydroperoxide and acetyl chloride.

14. t-Butyl peracetate.

15. The process of producing a tertiary alkyl perester, which comprises simultaneously reacting at a temperature not exceeding 20° C. and in the presence of an excess of a basic compound having a reactive basic OH group, a tertiary alkyl hydroperoxide and stearoyl chloride.

16. The process of producing t-butyl perstearate, which comprises simultaneously reacting at a temperature between 0° and 20° C. and in the presence of a relatively concentrated aqueous solution of an alkali metal hydroxide, t-butyl hydroperoxide and stearoyl chloride.

17. t-Butyl perstearate.

NICHOLAS A. MILAS.

(References on following page)

REFERENCES CITED

The following references are of record in the file of this patent:

UNITED STATES PATENTS

| Number | Name | Date |
|---|---|---|
| 2,319,576 | Agens | May 18, 1943 |
| 2,374,789 | Strain | May 1, 1945 |
| 2,403,709 | Dickey et al. | July 9, 1946 |

OTHER REFERENCES

Milas et al.: "Jour. Am. Chem. Soc.," vol. 68 (April 1946), pages 642 to 644 (two articles).

Baeyer et al.: Ber. Deut. Chem., vol. 34 (1901), pages 746, 747.

Medwedewa et al.: Ber. Deut. Chem., vol. 65 (1935), pages 136, 137.

Criegee: Ber. Deut. Chem., vol. 77 (1944), pages 22–24.